United States Patent [19]
Standlick

[11] 4,067,484
[45] Jan. 10, 1978

[54] VARIABLY ADJUSTABLE MEASURED INCREMENT POWER DISPENSING APPARATUS

[76] Inventor: Ronald E. Standlick, 4506 Sudbury St., Warren, Mich. 48092

[21] Appl. No.: 683,725

[22] Filed: May 6, 1976

[51] Int. Cl.[2] .............................................. G01F 11/06
[52] U.S. Cl. .................................... 222/309; 417/507; 251/63; 222/334
[58] Field of Search ............... 222/333, 394, 282, 287, 222/291, 309, 319, 389, 401, 504, 334, 263; 417/507; 251/63.5, 63

[56] References Cited

U.S. PATENT DOCUMENTS

| | | | |
|---|---|---|---|
| 1,566,814 | 12/1925 | Bliss | 251/63 |
| 3,037,245 | 6/1962 | Darnell | 251/63 |
| 3,622,050 | 11/1971 | Acton et al. | 222/309 |
| 3,637,116 | 1/1972 | Rutherford | 222/309 |

FOREIGN PATENT DOCUMENTS

| | | | |
|---|---|---|---|
| 545,933 | 7/1956 | Italy | 417/507 |

*Primary Examiner*—Robert B. Reeves
*Assistant Examiner*—H. Grant Skaggs
*Attorney, Agent, or Firm*—William T. Sevald

[57] ABSTRACT

Power dispensing apparatus for dispensing measured increments of colorants, lubricants, stabilizers, etc., into casting, paint, and synthetic resin, etc., industrial processes having a block with a displacement chamber and bi-directionally air powered valves controlling inlet-supply and outlet-use ports in conjunction with a displacement rod reciprocating in the chamber. A case is connected to the block and has a reciprocating piston attached to the rod. Air pressure is fed to the case to reciprocate the rod in one direction and from the case to opposite positions on the air powered valves to cause one to open and the other to close to effect dispensing an increment of material to use. Air pressure fed to the case to move the piston and rod in the other direction is also fed to the air powered valves to close the one and open the other to draw in material from supply. An adjusting screw limiting the stroke of the piston renders the apparatus variably adjustable as to the quantity dispensed. In this way the valves are air powered in both directions and coordinated with the stroke of the displacement rod. Larger channel supply air pressure to the valves at a faster rate than is supplied by the small orifices to the cylinder and piston reciprocating the rod to insure that the valves are properly positioned before the rod moves to draw-in or expel material.

2 Claims, 4 Drawing Figures

VARIABLY ADJUSTABLE MEASURED INCREMENT POWER DISPENSING APPARATUS

BACKGROUND OF THE INVENTION

In various industrial processes it is necessary to add measured increments of material at various stages of the processes. For example, in injection molding of plastics, colorant is added to produce colored products, in paint manufacture colorant is added to color paints, etc.. In other processes it is necessary to add lubricants, stabilizers, catalysts, etc.. Various spring-return valves have been used in the prior art to open and close ports to introduce the material into the process. These valves are power actuated in one direction and depend on spring return. The spring return has not proved entirely satisfactory as they can jam, weaken and break resulting in malfunction which causes scrap parts. Also these valves are not coordinated to actuate directly with the applied dispensing pressure so that delays in opening and closing occur and the desired accurate quantity of the material is not injected at the proper time.

SUMMARY OF THE PRESENT INVENTION

A block houses a displacement chamber which is connected to material supply and use via channels and orifices. A case overlies the block; a rod extends from the case into the displacement chamber of the block. A piston in the case advances the rod into and retracts it from the displacement chamber of the block.

A pair of bi-directionally powered valves control the inlet and outlet channels in the block in conjunction with the advancing and retracting of the rod in the chamber.

Air pressure is supplied to the piston in the case to advance the rod into the displacement chamber at the same time the air pressure is supplied to the inlet valve to close the inlet channel in the block and to the outlet valve to open the outlet channel in the block to emit a measured quantity of material equal to the cubic displacement of the rod's travel into the chamber.

Conversely, air pressure is supplied to the piston in the case to retract the rod out of the displacement chamber at the same time the air pressure is supplied to the inlet valve to open the inlet channel in the block and to the outlet valve to close the outlet channel in the block to draw in a measured quantity of material equal with the cubic evacuation of the rod in moving out of the chamber.

Controller means, not shown, switch the air pressure between the advancing and retracting cycles of the rod and the opening and closing of the valves.

Thus air pressure supplied to the case to advance the rod automatically powers the valves to their proper open and closed positions to eject material from the chamber to use.

Also, air pressure supplied to the case to retract the rod automatically powers the valves to their proper closed and open positions to draw material into the chamber from supply.

An adjustment screw on the case limits the retracting travel of the piston and its attached displacement rod to vary the travel of the piston out of and thus into the displacement chamber. If a larger increment of material is desired to be dispensed, the adjustment screw is backed off and the piston and rod allowed increased travel. Whereas if smaller increments are desired, the screw can be advanced to reduce the piston travel and thus reduce the quantity dispensed.

The specific details of the structure and operation of the apparatus are set forth in the detailed description following the description of the drawings.

DETAILED DESCRIPTION OF THE ILLUSTRATED EMBODIMENTS

Figure 4:
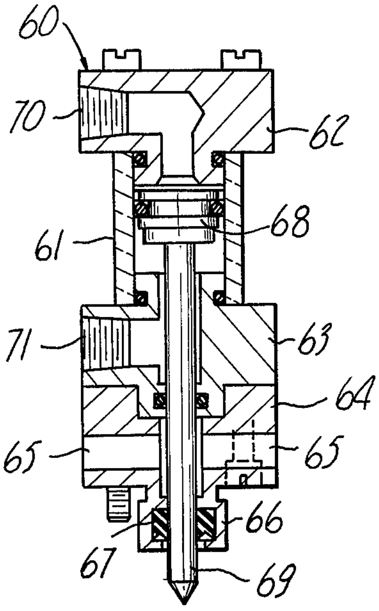
FIG. 4 is a cross-sectional view of a modified control valve showing it held together with two assembly screws inserted from the bottom and mountable on the block by two attaching screws inserted at the top; the screws are off-set 90° to one another.
Figure 3:
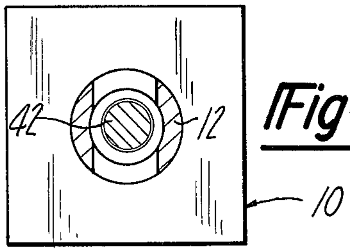
FIG. 3 is a cross-sectional view of the support and rod seen in FIG. 1, taken on the line 3—3 thereof.

Referring now to the drawings wherein like reference numerals refer to like and corresponding parts throughout the several views, the apparatus disclosed therein to illustrate preferred embodiments of the invention comprise a block 10, a case 11, and an inter-connecting support 12.

Figure 1:
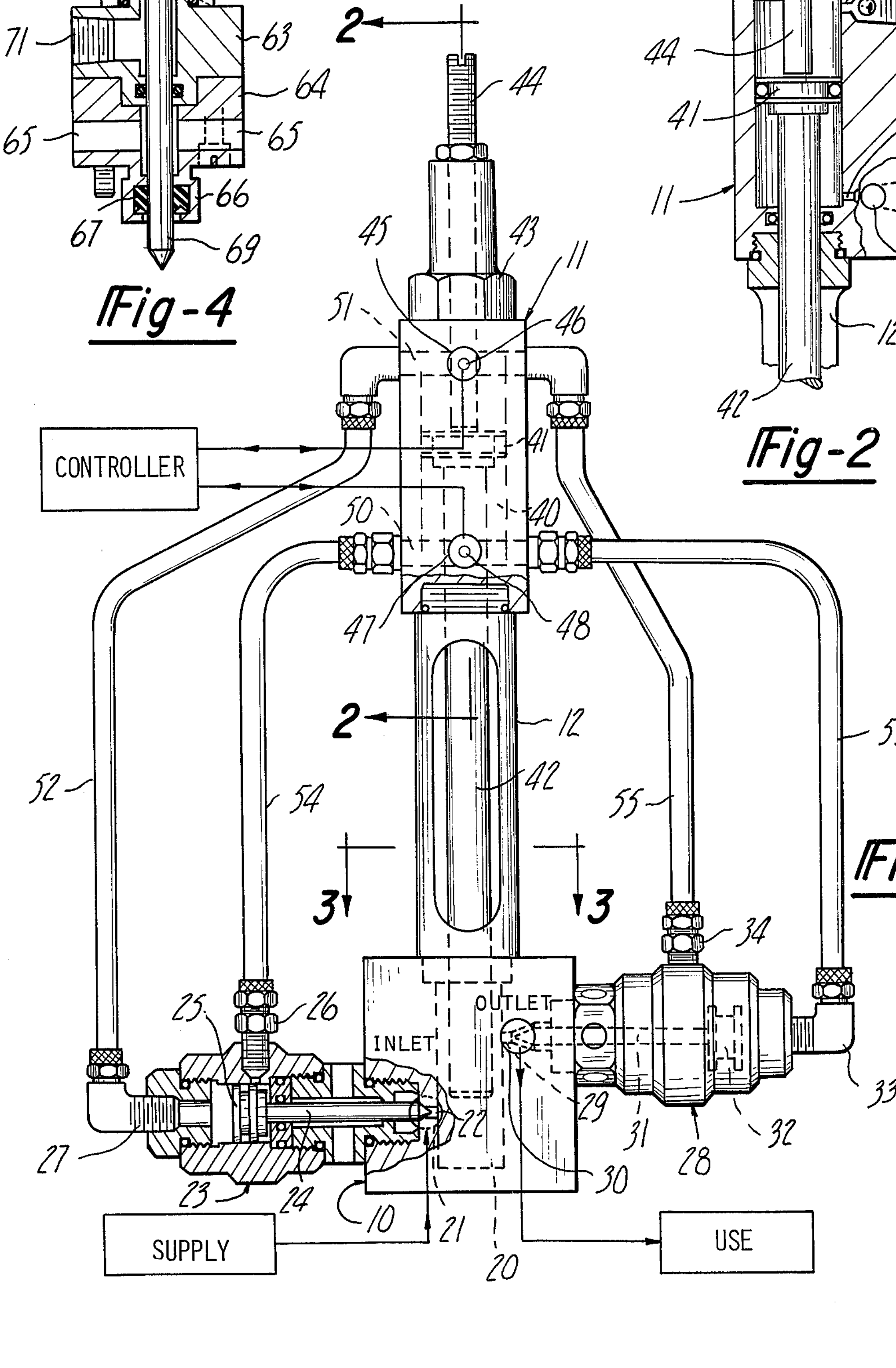
FIG. 1 is a face elevational view of the apparatus with a portion of the block seen at the bottom partially broken away to show the inlet and outlet orifaces, channels, and needle valves; indicating the displacement chamber in broken lines; showing the inlet and outlet valves at the sides of the block, with one shown in cross-section; showing the case at the top; support means between the case and the block; a displacement rod extending between the case and the block and into a displacement chamber in broken lines; showing the piston, cylinder and rod in broken lines in the case; and showing the air pressure ports in the case and air pressure tubes leading from the case to the control valves.

The block 10, FIG. 1, has a displacement chamber 20, an inlet orifice 21 leading from supply, and an inlet channel 22 leading to the chamber 20. A valve 23 has a needle 24 for opening and closing the channel 22. A piston 25 operates the needle 24. An air pressure connector 26 supplies pressure to move the piston 25 and needle 24 off the channel 22 to open it and an air pressure connector 27 furnishes pressure to move the piston 25 and needle 24 against the channel 22 to close it.

The block 10 also has an outlet channel 29 and outlet orifice 30 leading to use, a needle 31 for opening and closing the channel 29, a piston 32 on the needle 31 for moving the needle 31 against and away from the channel 29, an air pressure connector 33 for moving the piston 32 in, and an air pressure connector for moving the piston 32 out as in the case of the valve 23.

Figure 2:
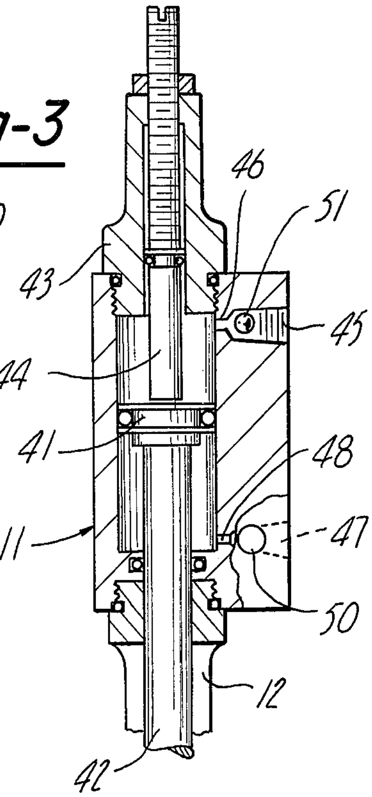
FIG. 2 is a cross-sectional view of the case portion of FIG. 1, taken on the line 2—2 thereof, showing the travel adjustment screw abuting the piston at the end of its retract stroke.

The case 11, FIGS. 1 and 2, has a cylinder 40, a piston 41, and a piston displacement rod 42 extending from the piston 41 to the displacement chamber 20 in the block 10. A cap 43 surmounts that case 11. An adjustment screw 44 is threaded in the cap 43. The screw 44 abuts the piston 41 and limits the up or evacuating suction-stroke of the rod 42 as desired to provide variable extension into and thus variable displacement in the displacement chamber 20 of the block 10.

An air pressure socket 45 and a relatively small orifice 46 supply air pressure to the top of the piston 41 to move the rod into the chamber 20 and an air pressure socket 47 and a relatively small orifice 48 supply air pressure to the bottom of the piston 41 to move the rod 42 out of the chamber 20.

A relatively large cross-channel 50 extends from the air socket 47 to either side of the case 11. Likewise a relatively large cross-channel 51 extends from the air socket 45 to either side of the case 11. An air tube 52 extends from one end of the cross-channel 51 to the connector 27 on control valve 23 to move the needle 24 in to close the supply channel 22. An air tube 53 extends from the other end of the cross-channel 51 to the connector 34 on control valve 28 to move the needle 31 out to open channel 29 to use. Thus when the piston 41 is powered to move the rod 42 into the displacement chamber 20, the inlet channel 22 is closed preventing escape of material and the outlet channel 29 is open allowing emission of material to use. It is to be noted that the larger channel 51 and tubes 52 and 53 supply air pressure more quickly to the valves 23 and 28 whereas the smaller orifice 46 supplies air pressure more slowly to the displacement piston 41. This insures that the needles 24 and 31 are moved to their respective dispensing positions before the displacement piston 41 and rod 42 are moved to displace the material in the chamber 20 to use.

To effect the suction stroke, an air tube 54 extends from one end of the other cross-channel 50 to the connector 26 on control valve 23 to move the needle 24 out to open the supply channel 22. An air tube 55 extends from the other end of the cross-channel 50 to the connector 34 on control valve 28 to move the needle 31 in to close channel 29 to use. Thus when the piston 41 is powered to move the rod 42 out of the displacement chamber 20, the inlet channel 22 is open allowing material from supply to enter and the outlet channel 29 is closed preventing escape of material to use. Here also the larger channel 50, as compared to orifice 48, and the tubes 54 and 55 supply air pressure more quickly to the valves 23 and 28 whereas the smaller orifice 48 supplies air pressure more slowly to the displacement piston 41. This insures that the needles 24 and 31 are moved to their respective suction positions before the displacement piston 41 and rod 42 are moved to draw material from supply into the chamber 20.

Referring now to FIG. 4, the modified air powered control valve 60 comprises a tubular cylinder 61, a head 62 on one end of the cylinder 61, a foot 63 on the other end of the cylinder 61 and an adapter 64 below the foot 63. The adapter has drain apertures 65 to prevent colorant, etc., from entering the foot 63 and cylinder 61, and a nose 66 with a seal 67 for entering the block 10. A piston 68 lies in the cylinder 61 and has an attached needle 69 for opening and closing against the channels 22 and 29 of the block. The head 62 has a threaded socket and channel 70 leading to one side of the piston 68 and the foot 63 has a threaded socket and channel 71 leading to the other side of the piston 68.

Air pressure introduced at the socket and channel 70 moves the piston 68 and needle 69 downwardly as shown to extend the needle 69 to close against the channels 22 and 29. Air pressure introduced at the socket and channel 71 moves the piston 68 and needle 69 upwardly as shown to retract the needle 69 from the channels 22 and 29 to leave them open. The tube 52–55 connections to the valve 60 are the same as for the valves 23 and 28 and the operation is the same as previously described.

In setting up the apparatus it is only necessary to make two air pressure connections from the controller to the sockets 45 and 47; connect a tube from the material supply to the inlet orifice 21; and connect a tube from the outlet orifice 30 to use.

The controller operates to switch the application of air pressure between the sockets 45 and 47 on the case 11 on a time interval as set on the controller by the user. The controller is a standard item and there are several types available on the market at various prices.

In use and operation, on the suction stroke, upon air pressure being applied to the socket 47, the pressure feeds through the channel 50, tube 54 and connector 26 to the inside of the piston 25 and it moves to the left as shown withdrawing the needle 24 from the channel 22 leaving it in open communication with supply orifice 21 and material supply connected thereto. The pressure also feeds through channel 50, tube 53, and connector 33 to the outside of the piston 32 in the valve 28 and it moves to the right as shown withdrawing the needle 31 from channel 29 leaving it in open communication with use orifice 30 and connections to use. The chamber 20 is now closed to supply and open to use.

The air pressure also feeds to the top side of the piston 41 in the case 11 and it moves downwardly as shown moving with it the displacement rod 42 and forcing it into the chamber 20 creating a high pressure or displacement in the chamber 20 whereupon material in the chamber 20 is forced out of the chamber 20 and fed to use.

The length of the stroke of the piston 41 and rod 42 is variably adjustable via the set screw 44 so that the travel of the rod 42 into and out of the chamber 20 may be established to emit the desired quantity of material to use on each compression stroke. The frequency of the reciprocation is adjustable via the controller so that the quantities and frequency can be varied as desired.

While two tubes 52 and 55 are shown connected to channel 51 and two tubes 53 and 54 are shown connected to channel 50, it will be understood that one tube may be used to connect to the channels 50 and 51 and a branch tube used to connect to both valves 23 and 28. Other adaptations may be made as desired without departing from the scope of the invention as defined by the appended claims such as substituting other valves, supports, etc.

I claim:

1. Measured increment dispensing apparatus for injecting material in industrial processes comprising, a block having a displacement chamber;

a case having a cylinder, a piston and a rod; the cylinder having a lower aperture substantially equal to the diameter of the rod, said rod leading from said piston into the displacement chamber of said block by way of said aperture; first air socket means for supplying air pressure to one side of said piston to move said rod out of said displacement chamber; and second air socket means for supplying air pressure to the other side of said piston to move said rod into said displacement chamber;

support means between said case and said block and radially spaced from said rod, said support means spacing said case and said cylinder apart to avoid one leaking into the other and to insure accuracy by holding said case cylinder and said block chamber in axial alignment for reciprocation of said rod in both said case and said block;

said block having a material supply channel leading to and a material use channel leading from said displacement chamber;

a first supply valve on said block controlling said supply channel and a second use valve on said block controlling said use channel;

each said valve having a cylinder, a piston, a needle on said piston for sealing off and opening up said supply and use channels, and advance and retract air connectors for supplying air pressure to advance said pistons and needles into sealing relationship and to retract said needles out of sealing relationship, each said valve being separated from the other said valve to operate independently of each other;

tubes leading from said first air socket on said case to said retract connector on said supply valve and to said advance connector on said use valve to close said displacement chamber to use and open it to supply in conjunction with the retracting stroke of said rod; and tubes leading from said second air socket on said case to said advance connector on said supply valve and to said retract connector on said use valve to close said displacement chamber to supply and to open it to use in conjunction with the advancing stroke of said rod;

application of air pressure at said first socket means on said case closing said use channel, opening said supply channel and retracting said rod to draw material into said displacement chamber;

application of air pressure at said second socket means on said case opening said use channel, closing said supply channel, and advancing said rod to force material out of said displacement chamber.

2. In apparatus as set forth in claim 1, a small orifice leading from each first and second socket means on said case to said cylinder on either side of said piston in said case, and large channels leading from each said first and second socket means on said case to said tubes leading to said connectors on said valves on said block;

said large channels supplying air pressure to said valves to open and close said supply and use channels in said block at a faster rate than said small orifices supply air pressure to said piston in said case to move said rod into and out of said displacement chamber.

* * * * *